United States Patent
Haviv et al.

(10) Patent No.: US 10,742,666 B2
(45) Date of Patent: *Aug. 11, 2020

(54) SYSTEM AND METHOD FOR STATIC DETECTION AND CATEGORIZATION OF INFORMATION-FLOW DOWNGRADERS

(71) Applicant: INTERNATIONAL BUSINESS MACHINES CORPORATION, Armonk, NY (US)

(72) Inventors: Yinnon Haviv, Herzliya (IL); Roee Hay, Haifa (IL); Marco Pistoia, Hawthorne, NY (US); Guy Podjarny, London (GB); Adi Sharabani, Herzliya (IL); Takaaki Tateishi, Yamato (JP); Omer Tripp, Herzliya (IL); Omri Weisman, Tel Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 109 days.

This patent is subject to a terminal disclaimer.

(21) Appl. No.: 15/015,960

(22) Filed: Feb. 4, 2016

(65) Prior Publication Data
US 2016/0156650 A1 Jun. 2, 2016

Related U.S. Application Data

(63) Continuation of application No. 12/575,647, filed on Oct. 8, 2009, now Pat. No. 9,275,246.

(51) Int. Cl.
G06F 17/30 (2006.01)
H04L 29/06 (2006.01)
(Continued)

(52) U.S. Cl.
CPC ............ *H04L 63/1416* (2013.01); *G06F 8/49* (2013.01); *G06F 11/3608* (2013.01); *G06F 21/6218* (2013.01)

(58) Field of Classification Search
None
See application file for complete search history.

(56) References Cited

U.S. PATENT DOCUMENTS 7,103,915 B2 * 9/2006 Redlich ............... G06F 21/6209
713/166
7,140,044 B2 * 11/2006 Redlich ............... G06F 21/6218
726/27

(Continued)

FOREIGN PATENT DOCUMENTS

CN 101331495 A 12/2008

OTHER PUBLICATIONS

Andrei Sabelfeld and Andrew C. Myers, Language-Based Information-Flow Security, IEEE Journal on Selected Areas in Communications, vol. 21, No. 1, published Jan. 2003.*

(Continued)

*Primary Examiner* — Jeff A Burke
(74) *Attorney, Agent, or Firm* — Tutunjian & Bitetto, P.C.; JoAnn Crockatt (57) ABSTRACT

A system and method for static detection and categorization of information-flow downgraders includes transforming a program stored in a memory device by statically analyzing program variables to yield a single assignment to each variable in an instruction set. The instruction set is translated to production rules with string operations. A context-free grammar is generated from the production rules to identify a finite set of strings. An information-flow downgrader function is identified by checking the finite set of strings against one or more function specifications.

20 Claims, 5 Drawing Sheets

(51) Int. Cl.
*G06F 8/41* (2018.01)
*G06F 11/36* (2006.01)
*G06F 21/62* (2013.01)

(56) References Cited

U.S. PATENT DOCUMENTS

| | | | | |
|---|---|---|---|---|
| 7,512,071 | B2* | 3/2009 | Goldschmidt | H04L 47/10 370/235 |
| 7,512,792 | B2* | 3/2009 | Arroyo | G06F 21/6218 713/167 |
| 7,530,107 | B1 | 5/2009 | Ono et al. | |
| 8,572,674 | B2* | 10/2013 | Dolby | G06F 21/53 726/1 |
| 8,695,056 | B2* | 4/2014 | Banerjee | G06F 21/6218 705/57 |
| 8,955,155 | B1* | 2/2015 | Allen | G06F 21/44 380/201 |
| 2003/0051054 | A1 | 3/2003 | Redlich et al. | |
| 2006/0272024 | A1* | 11/2006 | Huang | G06F 21/55 726/26 |
| 2007/0094646 | A1 | 4/2007 | Higham | |
| 2008/0306958 | A1 | 12/2008 | Sreedhar | |

OTHER PUBLICATIONS

Annalisa Bossi, Carla Piazza and Sabina Rossi, Modelling Downgrading in Information Flow Security, Proceedings of the 17th IEEE Computer Security Foundations Workshop, published 2004.*

Tripp et al., "TAJ: Effective Taint Analysis of Web Applications", PLDI'09, Jun. 8, 2009. (Year: 2009).*

Denning, D., et al. "Certification of Programs for Secure Information Flow," Communications of the ACM, vol. 20. Jul. 31, 1977. (pp. 504-513).

Baldwin. Constructing Regular Expressions From DFAS. SUNY Geneseo Department of Computer Science. Sep. 2006. http://www.cs.geneseo.edu/~baldwin/csci342/fall2006/0919dfa2re.html.

Christensen, et al. Precise Analysis of String Expressions, In SAS'03: Proceedings of International Static Analysis Symposium, vol. 2695 of LNCS. Jun. 2003, pp. 1-18. http://www.brics.dk/~amoeller/papers/strings/strings.pdf.

Cytron, et al. Efficiently Computing Static Single Assignment Form and the Control Dependence Graph. ACM Transactions on Programming Languages and Systems, vol. 13. Oct. 1991. pp. 451-490.

Grove, et al. A Framework for Call Graph Construction Algorithms, ACM Transactions on Programming Languages and Systems. vol. 23 No. 6, Nov. 2001. pp. 685-746.

Minamide. Static Approximation of Dynamically Generated Web Pages. In WWW '05: Proceedings of the 14th international conference on World Wide Web. May 2005. pp. 432-441.

Mohri, et al. Regular Approximation of Context-Free Grammars Through Transformation. In Jean-Claude Junqua and Gertjan van Noord, editors, Robustness in Language and Speech Technology. Dordrecht, 2001. pp. 153-163.

Wassermann, et al. Sound and Precise Analysis of Web Applications for Injection Vulnerabilities. In PLDI'07: Proceedings of Programming Language Design and Implementation. Jun. 2007. (10 Pages).

* cited by examiner

SYSTEM AND METHOD FOR STATIC DETECTION AND CATEGORIZATION OF INFORMATION-FLOW DOWNGRADERS

BACKGROUND

Technical Field

The present invention relates to static program analysis and more particularly to string analyses that infer string values arising at runtime without executing a program to provide a function analysis for automatic detection and categorization of information-flow downgraders.

Description of the Related Art

The Information-Flow Security principle establishes that no "illicit flow" of information be allowed in a program. A flow is illicit if it allows untrusted information to be used in a trusted computation (an integrity violation) or if it allows secret information to be entirely or partly revealed to unauthorized users (a confidentiality violation). Integrity and confidentiality can be seen as dual problems by simply stating that there should not be any flow of information from "high" to "low", where "high" means "untrusted" in integrity and "secret" in confidentiality, and low means "trusted" in integrity and "public" in confidentiality.

Information can be tagged with information flow labels. Typically, information flow labels form a partially ordered set or even a lattice. If information-flow security was strictly enforced and no illicit flow of information was allowed, most programs would not work. To be information-flow secure, a program would have to be "partitioned" so that information tagged with a certain label "/" can only flow to program points that have been tagged with labels higher than or equal to "/". A program with these restrictions is very unlikely to be useful. For example, from an integrity point of view, a Web application is supposed to accept inputs from potentially untrusted users and use those inputs in trusted computations. E.g., an online banking program takes as input the account number and the password of a user (potentially untrusted or malformed information) and passes them to the backend database system where they are used in a trusted setting. In another example, an online bookstore takes as input the user ID and password of the customer and the title of the book that the customer wants to buy (all potentially untrusted or malformed information), and uses them to complete a transaction, etc.

From a confidentiality point of view, a Web application often releases data that has been computed based on secret information and, as such, should be considered secret as well. E.g., a banking application may reveal to any teller the last four digits of the social security number of any user, an online bookstore may reveal to any shop assistant the last four digits of any customer's credit card number, etc. Given that all these programs exhibit flows that allow "high" information to flow to "low" program points, all these programs would be rejected if information-flow security were simply enforced. To permit these programs to function, "high" information can be "downgraded" and become "low" enough to be used in "low" program points.

Downgrading translates itself into "endorsement" in integrity and "declassification" in confidentiality. For example, once a program has verified that the user-provided input to a Web application is a properly formatted string, the program can endorse that input, which now becomes trusted enough to be used in a trusted computation. Similarly, once a program has verified that the information extracted from a secret is not sufficient to reveal the secret itself, the program can declassify the extracted information, which now can become public enough to be revealed to a public listener.

TABLE 1

| Information-Flow Security | | |
|---|---|---|
| | Integrity | Confidentiality |
| High | Untrusted | Secret |
| Low | Trusted | Public |
| Downgrading | Endorsement | Declassification |

A program can implement many downgraders. A program should not accept any "high" input to a "low" function unless that "high" input has been previously downgraded. Furthermore, a downgrader is specific for just a subset of the set of "low" functions. For example, an integrity "low" function that accepts an input in the form of a string, concatenates that string into a Structured Query Language (SQL) query, and then submits it to a database. The function will require its input not to contain semicolons and apostrophes, since such characters will be interpreted by the database as SQL commands. Therefore, any input to this "low" function should have undergone sanitization or endorsement, to make sure that such illicit characters are not there.

Only if a trusted sanitizer has verified the absence of such illicit characters will that initially untrusted string be accepted to be used in the SQL query. However, if the "low" function is not responsible for performing SQL queries, but rather for concatenating its string input value into HyperText Markup Language (HTML) code, then a different sanitization is necessary. The issue here is no longer to prevent SQL injections, but rather to prevent what are known as Cross-Site Scripting (XSS) attacks. In this case, the sanitization function must check for absence of specific JavaScript tags, such as <script> and </scripts>.

Downgraders are often available in libraries, and are categorized based on the specifications of the corresponding "low" functions. Often, however, Web applications implement their own downgrading functions. This makes security static analysis of Web applications very complex. In fact, a static analysis for information-flow security should receive as input the signature of the downgrading functions as well as rules that map downgrading functions to the corresponding "low" functions. At that point, the static analysis can verify whether the input to a "low" function has always undergone proper downgrading, without any path leading to a "low" function unless its inputs have been properly downgraded. Unfortunately, when Web applications implement their own downgrades, it is very difficult to detect those downgraders and categorize them in a way that the static analysis for information-flow security can subsequently account for them.

The difficulties may include the following: 1. If manual code inspection is adopted, not all the source code may be available. Some code may have been produced and purchased by a third party. Therefore, manual code inspection for detection and categorization of information-flow downgraders may not be possible. Even if all the source code is available, manual code inspection may not be a feasible option given the large amount of code that needs to be inspected. In general, manual code inspection is error-prone, difficult, time consuming, and unreliable. 2. Dynamic analysis or testing could be used. However, the coverage of a dynamic analysis depends on the completeness of the test-case suite under use. In the absence of a complete suite of test cases, a dynamic analysis is not guaranteed to detect all the possible downgraders used by an application, and the categorization of the downgraders will be incomplete.

SUMMARY

A system and method for static detection and categorization of information-flow downgraders includes transforming a program stored in a memory device by statically analyzing program variables to yield a single assignment to each variable in an instruction set. The instruction set is translated to production rules with string operations. A context-free grammar is generated from the production rules to identify a finite set of strings. An information-flow downgrader function is identified by checking the finite set of strings against one or more function specifications.

A method for static detection and categorization of information-flow downgraders includes transforming a program stored in a memory device by statically analyzing program variables to yield a single assignment to each variable in an instruction set. The instruction set is translated into production rules with string operations. A pointer analysis is performed on the production rules with string operations to improve precision. A context-free grammar is generated from the production rules to identify a finite set of strings. The context free grammar is compared with a specification of a security-sensitive function such that if the grammar satisfies the specification the input is considered properly downgraded. A string is labeled to locate string-manipulating functions that modified an input and made the input specification-compliant to identify and categorize an information-flow downgrader function.

A system for static detection and categorization of information-flow downgraders includes a program storage device configured to store a program. The program storage device is configured to work in conjunction with a processor to execute program instructions to detect and categorize information-flow downgraders in the program. A static analysis framework is configured to analyze an application program and to perform a static string assignment on the application program to transform program variables to yield a single assignment for each variable in an instruction set. The framework is configured to translate the instruction set to production rules with string operations and generate a context-free grammar from the production rules to identify a finite set of strings. A comparison module is configured to detect and categorize the finite set of strings by comparing the finite set of strings against one or more function specifications to identify an information-flow downgrader function.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments in accordance with the present principles employ static string analysis for automatic detection and categorization of information-flow downgraders. The use of static string analysis identifies downgraders and categorizes them based on their purposes. In one illustrative embodiment, the analysis proceeds as follows. For each security-sensitive function in the program, we use string analysis to detect the grammar(s) of the string input(s) to the function. We then compare that grammar with a specification of the security-sensitive function. If the grammar satisfies the specification, it implies that the input was properly downgraded. In that case, using the labeling feature of the string analysis, it is possible to locate the string-manipulating functions that modified the input and made it specification-compliant. Those functions constitute a downgrader for the security-sensitive function. Furthermore, the specification of the security-sensitive function can be used to categorize the newly discovered downgrader, which is one important feature given that a downgrader for a security-sensitive function may not work for another security-sensitive function.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
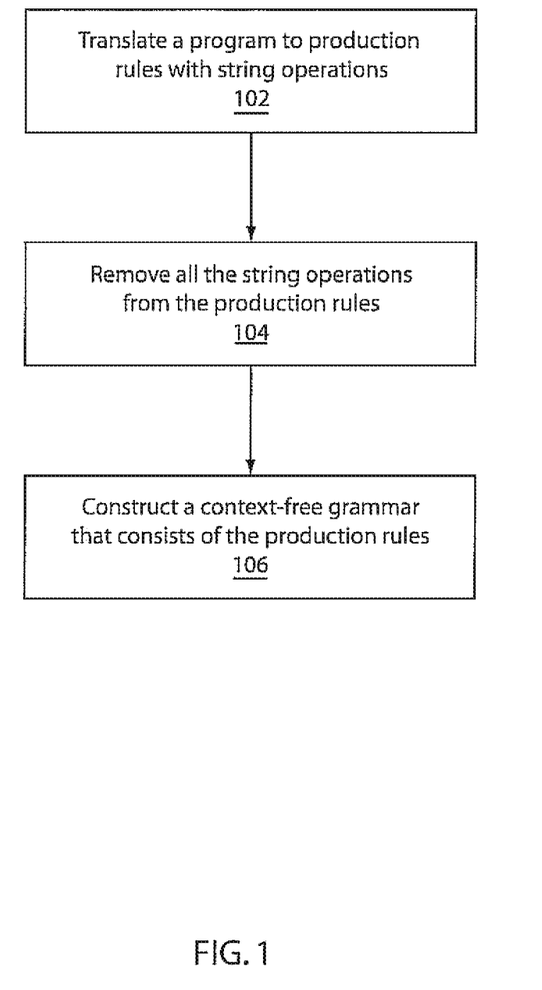
FIG. 1 is a block/flow diagram showing a string analysis system/method in accordance with one illustrative embodiment.

Referring now to the drawings in which like numerals represent the same or similar elements and initially to FIG. 1, a block/flow diagram showing high level steps for performing a string analysis in accordance with the present principles is illustratively shown. We first translate a program into a context-free grammar (CFG) with string operations in block 102 (see e.g., (Yasuhiko Minamide, "Static approximation of dynamically generated web pages", Proceedings of the 14th international conference on World Wide Web (WWW'05), 2005). We then remove the string operations from the production rules by applying functions over CFGs in block 104. Those functions, called approximated string operations, are corresponding to the string operations in the program respectively. We iterate the application of the approximated string operations until we do not have any string operations in the production rules. Finally, we obtain the context-free grammar that consists of the production rules without string operations in block 106.

Let us consider the following Java program, which append "a" to the string assigned to the variable a three times after initializing it with "a".

```
String a = "a";
for (int i = 0; i < 3; i++)
    a = a + "a";
String r = a;
```

We obtain the following CFG by translating every program variable v to a nonterminal $S_v$ and → to as in production rules, where we simply consider the string concatenation by + as the string concatenation on the CFG.

$S_a \rightarrow a$
$S_a \rightarrow S_a a$
$S_r \rightarrow S_a$

For example, the CFG with start symbol $S_a$ represents a set of possible string values assigned to the program variable a, which yields the set of strings {"a","aa","aaa", "aaaa", . . . }, and likewise $S_r$ represents a set of possible string values assigned to the program variable r. It contains strings that are never assigned to the variables a and r, since our string analysis completely ignores the condition of the for statement as of now.

In block 104, when we have a program that uses predefined string operations such as String.substring as shown in the following program, we use a sound approximation for every string operation to translate a CFG to a CFG.

```
String a = "xxa";
for (int i=0; i<3; i++) a = a + "a";
String r = a.substring(2);
```

Soundness means that a resulting CFG computed by the string analysis contains all the actual strings arising at runtime. Soundness may be formally defined as follows: $f$ is a sound approximation for a string operation f iff $S' \subseteq f(S)$ where $S'=(s'|s'=f(s), s \in S)$. One of the methods to approximate predefined string operations is to use a transducer which is an automaton with output. It is well known that the image of a transducer is also a CFG. Other methods are homomorphisms on $(\Sigma,+)$ where $\Sigma$ is a set of characters and + denotes concatenation functions that always return the same CFG yielding all the possible strings returned by corresponding predefined string operations, and so on. The following production rules with the approximated string operation substring (_,2) are the ones obtained from the program above.

Figure 2:
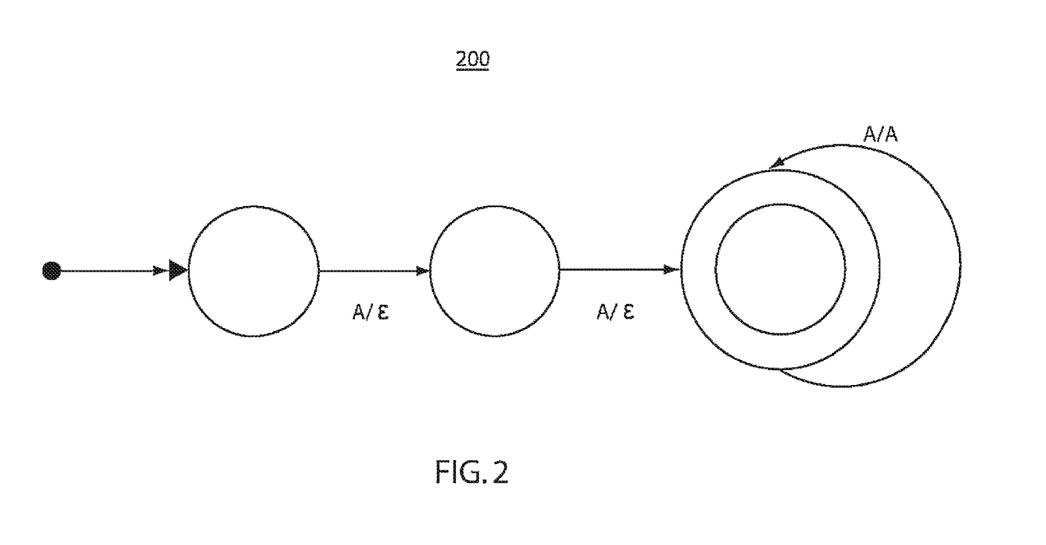
FIG. 2 is a transducer diagram for an illustrative transducer substring(_,2)

$S_a \rightarrow xxa$
$S_a \rightarrow S_a a$
$S_r \rightarrow substring(S_a, 2)$ Referring to FIG. 2, a transducer 200 is illustrative depicted. An approximated string operation substring (_,2) is defined by the transducer 200 and is a sound approximation for the string operation _.substring (2). By applying that transducer 200 to the grammar, we can obtain the following CFG which represents the set {"a","aa","aaa","aaaa", ... }.

$S_a' \rightarrow a$
$S_a' \rightarrow S_a' a$
$S_r' \rightarrow S_a'$

A in FIG. 2 represents any character while A/c represents a transformation of any one character to the empty, which means removing the character.

In block 106, we have no string operation in the production rules. Thus, a context-free grammar consisting of the resulting production rules is the outcome of the string analysis.

Figure 3:
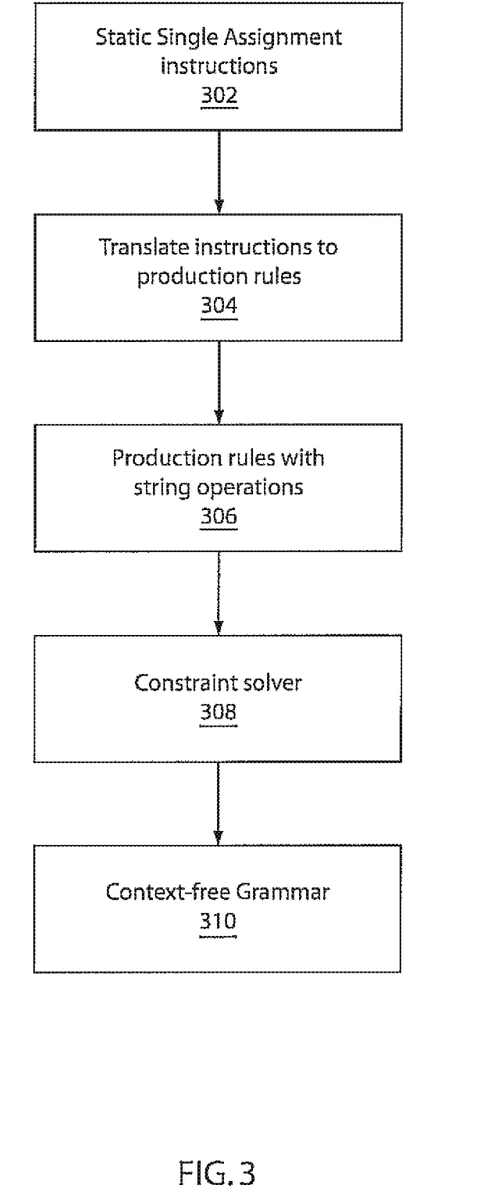
FIG. 3 is a block/flow diagram showing a string analysis system/method in accordance with another illustrative embodiment.

Referring to FIG. 3, a preferred embodiment will now be described for implementing a static string analysis (SSA) in accordance with the present principles. The description provided deals with intra-procedural string analysis, and then explains how to extend that to inter-procedural string analysis. The implementation details presented assume that the string analysis has been implemented on top of a static analysis framework. The static analysis framework employed may be any known framework and may include, e.g., the Watson Libraries for Analysis (WALA), available as an open source product from http://wala.sourceforge.net.

To describe the intra-procedural string analysis, let us consider a nappend method in Java™ as follows:

```
public class MyClass {
    static public void main(String args[ ]) {
        String a = "a"; String b = "b";
        String r = nappend(a, b, 3);
    }
    public void nappend(String x, String y, int n) { String r =
    null;
```

```
        if (n == 0) {
            r = x;
        }
        else {
            r = nappend(x + y, y, n-1);
        }
        return r;
    }
}
```

In block 302, a translation of a program is made into Static Single Assignment (SSA) form, where pseudo notations are used for instructions. An example, translation is illustratively shown as follows:

```
main(String)
    2. a = "a"
    3. b = "b"
    4. r = nappend(a, b, 3)
nappend(String)
    1. b1 = n == 0
    2. goto 6 if b1
    3. v1 = x + y
    4. r1 = nappend(v1, y, n-1)
    5. goto 8
    6. r2 = x
    7. goto 8
    8. r = phi(r1,r2)
    9. return r
```

Figure 4:
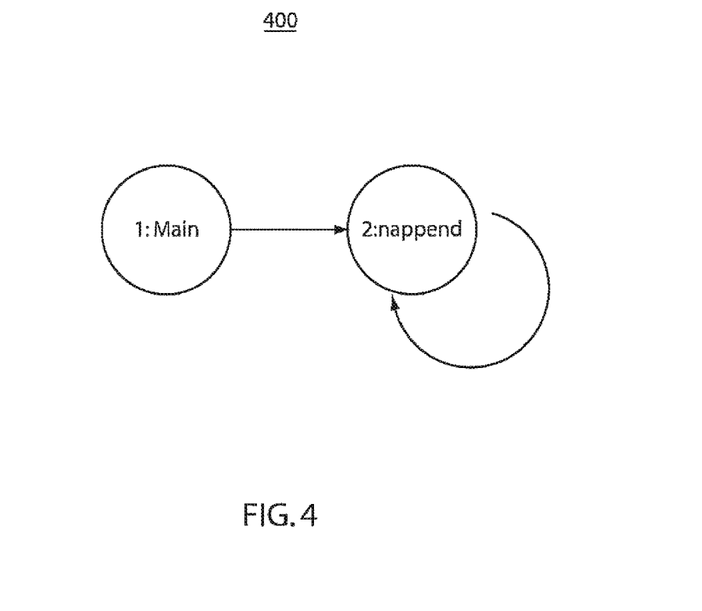
FIG. 4 is a call graph for calling a nappend routine in accordance with one illustrative embodiment.

A call graph for this program is depicted in FIG. 4. Pseudo notations used for instructions in the above program include v=val for an assignment of a value val to a variable or a field v, v=obj.func (v1, ... , vn) for a method invocation with arguments v1, ... , vn, goto N for an unconditional jump to the label N, goto N if v for a conditional jump to the label N by the condition v. In addition, the SSA transformation introduces new variables and a φ-function, which is denoted by phi (v1, v2), to yield a program which has only one assignment to each variable. This characteristic of the SSA form is suitable to find data dependencies.

In block 304, the assignments in SSA form are translated to a set of production rules with string operations 306, except for conditional and unconditional jumps, in the same manner described above (FIG. 1). In particular, v=phi (v1, v2) is translated into two production rules $S_v \rightarrow S_{v1}$ and $S_v \rightarrow S_{v2}$ so as to make it represent a union of the two sets of strings assigned to v1 and v2, respectively. According to this translation, we can obtain the following production rules from the pseudo SSA form of the nappend method.

$S_{v1} \rightarrow S_x S_y$
$S_r^1 \rightarrow nappend(S_{v1}, S_y, n-1)$
$S_{r2} \rightarrow S_x$
$S_r \rightarrow S_{r1}$
$S_r \rightarrow S_{r2}$ For the inter-procedural string analysis, we extend the intra-procedural string analysis with the call graph information constructed by WALA, whose context-sensitivity can be flexibly controlled by known methods. We annotate every variable in the SSA program with a call graph node. We combine all the production rules after removing production rules translated from method invocations such as $S_r^1 \rightarrow nappend(S_{v1}, S_y, n-1)$. We introduce production rules representing dependencies between the parameters and the return value of a callee method and the variables of a caller method. For example, the following production rules are introduced if we have a context-insensitive call graph 400 as shown in FIG. 4, where the superscript of each nonterminal represents the corresponding call graph node. The production rules are:

$S_x^2 \to S_a^1 S_x^2 \to S_{v1}^2$
$S_y^2 \to S_b^1 S_y^2 \to S_y^2$
$S_r^1 \to S_r^2 S_{r1}^2 \to S_r^2$

A complete set of the production rules with string operations 306 obtained from the program includes:

$S_a^1 \to a \; S_x^2 \to S_a^1$
$S_b^1 \to b \; S_y^2 \to S_b^1$
$S_{v1}^2 \to S_x^2 S_y^2 \; S_r^1 \to S_r^2$
$S_{r2}^2 \to S_x^2 \; S_x^2 \to S_{v1}^2$
$S_r^2 \to S_{r1}^2 \; S_y^2 \to S_y^2$
$S_r^2 \to S_{r2}^2 \; S_{r1}^2 \to S_r^2$

An optional pointer analysis may be performed that helps the string analyzer or solver 308 to identify how constant strings flow to variables across methods and to identify whether the same objects are assigned to different variables in potentially different methods, even if those objects are dynamically created. In block 310, we then obtain the following CFG that predicts possible strings assigned to the variable r in the main method, where the start symbol is $S_r^1$.

$S_r^1 \to a|S_r^1 b$

Figure 5:
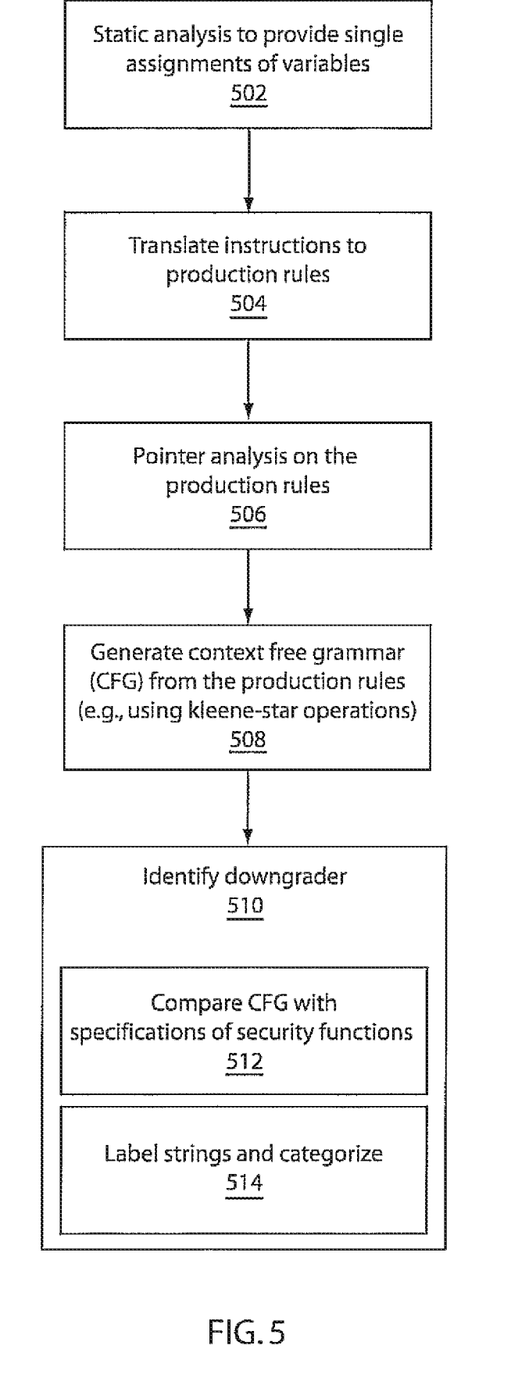
FIG. 5 is a block/flow diagram showing a system/method for detecting and categorizing downgraders in accordance with one illustrative embodiment.

Referring to FIG. 5, a block/flow diagram illustratively depicts a system and method for static detection and categorization of information-flow downgraders in accordance with the present principles. In block 502, a program stored in a memory device is transformed by statically analyzing program variables to yield a single assignment to each variable in an instruction set. This includes transforming the program by employing pseudo notations for program variable assignments.

In block 504, the instruction set is translated to production rules with string operations. In block 506, a pointer analysis is optionally performed on the production rules with string operations to improve precision. In block 508, a context-free grammar is generated from the production rules to identify a finite set of strings. A kleene-star operator may be employed to identify the finite set of strings.

In block 510, an information-flow downgrader function is identified by checking the finite set of strings against one or more function specifications. The one or more functions preferably include a security-sensitive function in the program. This may include detecting and categorizing the downgrader functions based upon a purpose the downgrader function.

In block 512, the context free grammar is preferably compared with a specification of a security-sensitive function such that if the grammar satisfies the specification, the input is considered properly downgraded. In block 514, a string is labeled to locate string-manipulating functions that modified an input and made the input specification-compliant to identify and categorize an information-flow downgrader function. The one or more function specifications are employed to categorize the downgrader function. The downgrader function may be generated by a Web application or any other entity that employs security levels for dealing with its network transactions.

Figure 6:
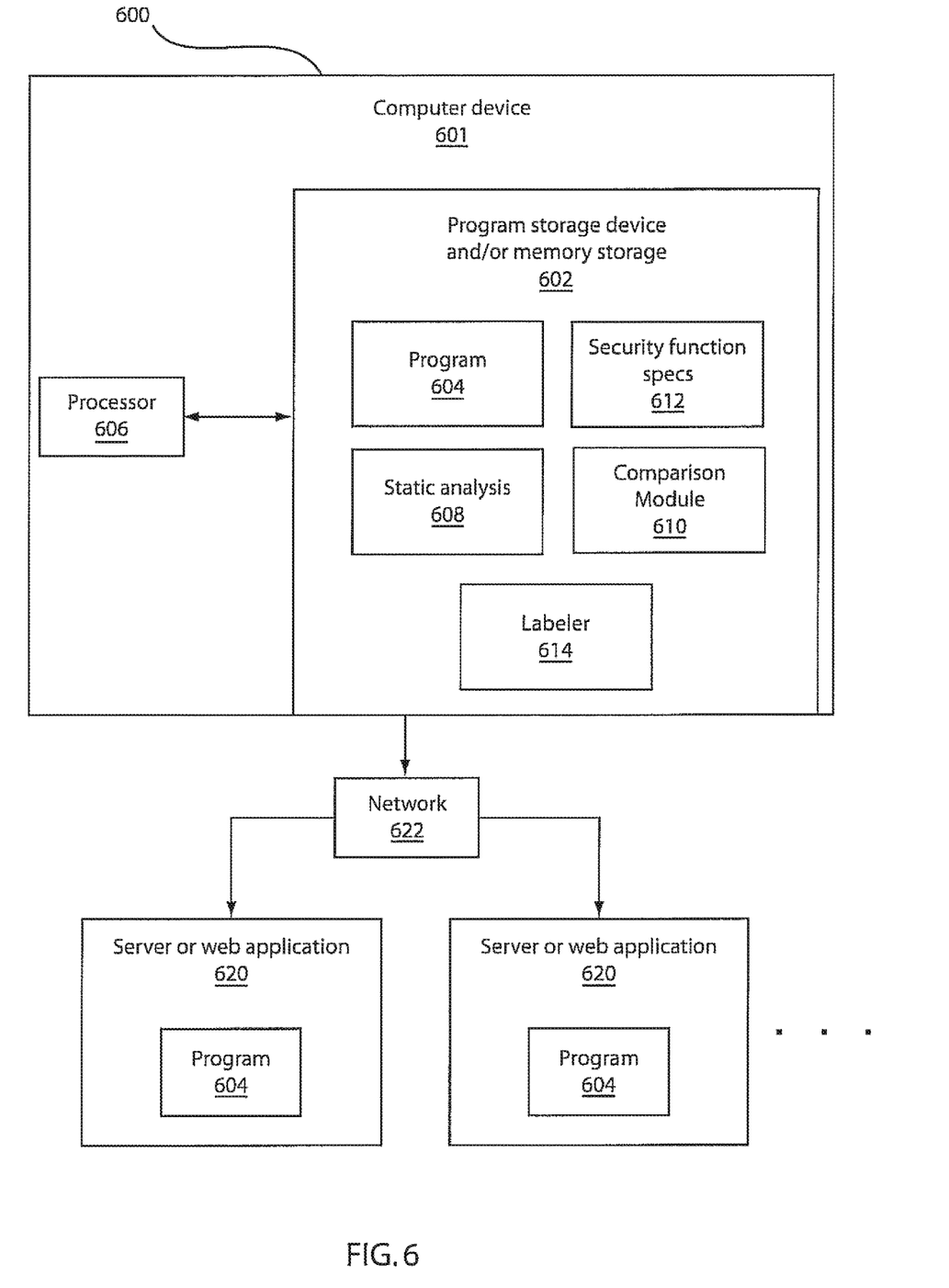
FIG. 6 is a block/flow diagram showing a system for detecting and categorizing downgraders in accordance with the present principles.

Referring to FIG. 6, a system 600 for static detection and categorization of information-flow downgraders is illustratively depicted. A program storage device or memory storage device 602 may include a computer hard drive or other computer media and is configured to store a program 604. The program storage device 602 is further configured to work in conjunction with a processor 606 on a computer device 601 to execute program instructions to detect and categorize information-flow downgraders in the program 604. A static analysis framework 608, which may be associated with a server, mainframe or any other computing device is configured to analyze an application program and to perform a static string assignment on the application program to transform program variables to yield a single assignment for each variable in an instruction set. The framework 608 is configured to translate the instruction set to production rules with string operations and generate a context-free grammar (CFG) from the production rules, which may employ a kleene-star operator to identify a finite set of strings. A comparison module 610 is configured to detect and categorize the finite set of strings by comparing the finite set of strings against one or more function specifications to identify an information-flow downgrader function.

The comparison module 610 compares the context free grammar (CFG) with a specification 612 of a security-sensitive function such that if the grammar satisfies the specification the input is considered properly downgraded. A labeler 614 is configured to label a string to locate string-manipulating functions that modified the input and made the input specification-compliant. Those functions constitute a downgrader for the security-sensitive function. Furthermore, the specification of the security-sensitive function can be used to categorize the newly discovered downgrader, which is one important feature given that a downgrader for a security-sensitive function may not work for another security-sensitive function. The downgrader functions that are generated by an entity, such as, a Web application, secure network devices, access controlled devices, etc. are thereby identified and categorized.

The program analyzed may be co-located with the system 600 or may be remotely disposed from the system 600. A program 603 may be analyzed for downgraders as provided over a network from a server or web application 620. The servers or web applications may be located in at a single location or may be distributed throughout a network 622.

Having described preferred embodiments of a system and method for static detection and categorization of information-flow downgraders (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for static detection and categorization of information-flow downgraders, comprising:
   statically analyzing program variables to yield a single assignment for each variable in an instruction set;
   translating the instruction set to production rules with string operations to identify a finite set of strings;
   generating a context-free grammar from the production rules; and
   preventing illicit flow of input information by comparing the finite set of strings with one or more function specifications to identify an information flow downgrader function, the information-flow downgrader function downgrading the input information to enable high input information to flow to low program points by endorsing integrity and declassifying confidentiality of the input information.

2. The method as recited in claim 1, wherein identifying includes detecting and categorizing the downgrader functions based upon a purpose the downgrader function.

3. The method as recited in claim 1, wherein the one or more functions include a security-sensitive function in the program.

4. The method as recited in claim 1, further comprising comparing the context free grammar with a specification of the security-sensitive function such that if the grammar satisfies the specification, the input is considered properly downgraded.

5. The method as recited in claim 4, further comprising labeling a string to locate string-manipulating functions that modified the input and made the input specification-compliant.

6. The method as recited in claim 1, wherein one or more function specifications are employed to categorize the downgrader function.

7. The method as recited in claim 1, wherein transforming the program includes transforming the program by employing pseudo notations for program variable assignments.

8. The method as recited in claim 1, wherein the downgrader function is generated by a Web application.

9. A computer readable storage medium comprising a computer readable program for static detection and categorization of information-flow downgraders, wherein the computer readable program when executed on a computer causes the computer to perform the steps of:
   statically analyzing program variables to yield a single assignment to each variable in an instruction set;
   translating the instruction set to production rules with string operations;
   generating a context-free grammar from the production rules to identify a finite set of strings; and
   preventing illicit flow of input information by comparing the finite set of strings with one or more function specifications to identify an information flow downgrader function, the information-flow downgrader function enabling high input information to flow to low program points by endorsing integrity and declassifying confidentiality of the input information.

10. The computer readable storage medium as recited in claim 9, wherein identifying includes detecting and categorizing the downgrader functions based upon a purpose the downgrader function.

11. The computer readable storage medium as recited in claim 9, wherein the one or more functions include a security-sensitive function in the program.

12. The computer readable storage medium as recited in claim 9, further comprising comparing the context free grammar with a specification of the security-sensitive function such that if the grammar satisfies the specification the input is considered properly downgraded.

13. The computer readable storage medium as recited in claim 12, further comprising labeling a string to locate string-manipulating functions that modified the input and made the input specification-compliant.

14. The computer readable storage medium as recited in claim 9, wherein the one or more function specifications are employed to categorize the downgrader.

15. The computer readable storage medium as recited in claim 9, wherein transforming the program includes transforming the program by employing pseudo notations for program variable assignments.

16. A system for static detection and categorization of information-flow downgraders, comprising:
   a program storage device configured to store a program, the program storage device further configured to work in conjunction with a processor to execute program instructions to detect and categorize information-flow downgraders in the program;
   a static analysis framework configured to analyze an application program and to perform a static string assignment on the application program to transform program variables to yield a single assignment for each variable in an instruction set, the framework configured to translate the instruction set to production rules with string operations and generate a context-free grammar from the production rules to identify a finite set of strings; and
   a comparison module configured to prevent illicit flow of input information by comparing the finite set of strings with one or more function specifications to identify an information flow downgrader function, the information-flow downgrader function downgrading the input information to enable high input information to flow to low program points by endorsing integrity and declassifying confidentiality of the input information.

17. The system as recited in claim 16, wherein downgrader functions are categorized based upon a purpose of the downgrader function.

18. The system as recited in claim 16, wherein the one or more functions include a security-sensitive function in the program.

19. The system as recited in claim 16, wherein the comparison module compares the context free grammar with a specification of a security-sensitive function such that if the grammar satisfies the specification the input is considered properly downgraded.

20. The system as recited in claim 19, a labeler configured to label a string to locate string-manipulating functions that modified the input and made the input specification-compliant.

* * * * *